United States Patent [19]
Warner

[11] 3,922,634
[45] Nov. 25, 1975

[54] SONAR SYSTEM
[75] Inventor: Henry L. Warner, Panama City, Fla.
[73] Assignee: The United States of America as represented by the Secretary of the Navy, Washington, D.C.
[22] Filed: Sept. 29, 1965
[21] Appl. No.: 492,358

[52] U.S. Cl. ................................. 340/6 R; 340/16
[51] Int. Cl.$^2$ ........................................... G01S 3/80
[58] Field of Search ............. 343/113, 113.1, 114.5; 340/6, 16, 16 P

[56] References Cited
UNITED STATES PATENTS
| | | | |
|---|---|---|---|
| 2,885,590 | 5/1959 | Fuller | 315/1 |
| 2,943,322 | 6/1960 | Asbury, Sr. | 343/118 |
| 2,951,248 | 8/1960 | Goodell | 343/113 |

OTHER PUBLICATIONS
Heydemann, Acustica, Vol. 13, 1963, pp. 421–426.
IEEE Trans. on Antennas and Propagation, Vol. AP 13, Mar., 1965, pp. 318 319.

*Primary Examiner*—Richard A. Farley
*Attorney, Agent, or Firm*—Richard S. Sciascia; Don D. Doty

[57] ABSTRACT

A sonar system having means for controlling the angular beamwidth or resolution of a received acoustical signal, said sonar system including a pair of hydrophones, a pair of tunnel diode switches for respectively producing marker pulses at the times negative-going zero-crossing acoustical signals make contact with said pair of hydrophones, a pair of variable differentiators for differentiating said marker pulses, an adder for adding said differentiated marker pulses, a coincidence detector for producing a squarewave type of signal the positive portion of which is proportional to selected periods of coincidence of said marker pulses in response to the addition thereof, an integrator for producing a voltage representing the integration of the positive portions of said squarewave type of signal, and a display for reading out said voltage.

16 Claims, 8 Drawing Figures

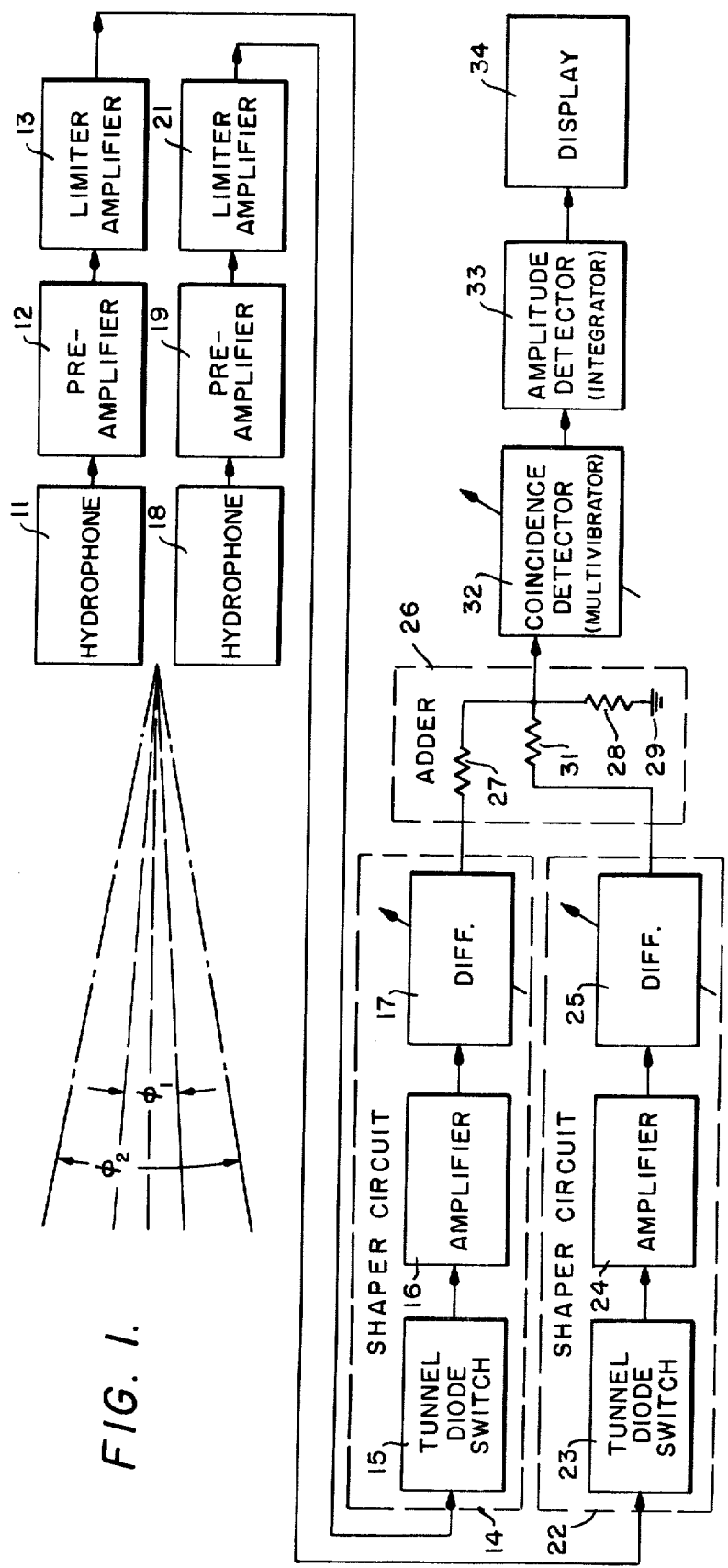
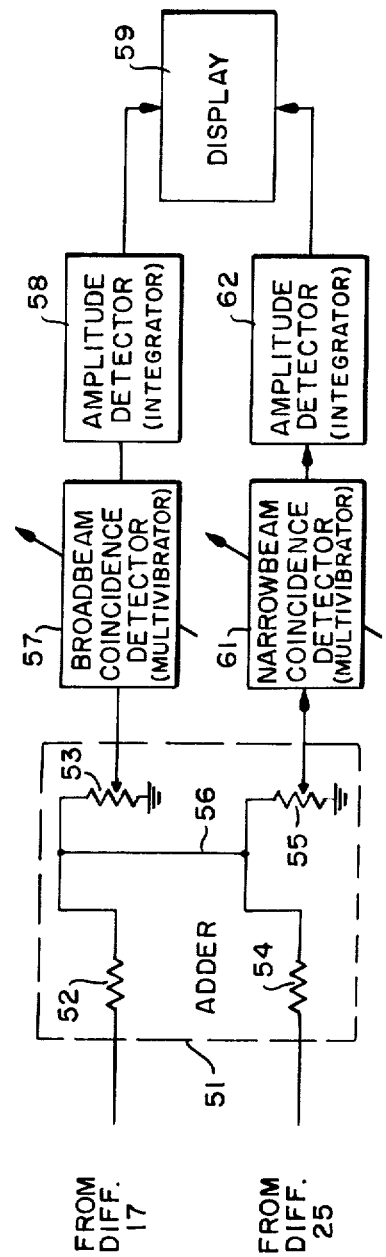
FIG. 1.
FIG. 3.
INVENTOR.
HENRY L. WARNER

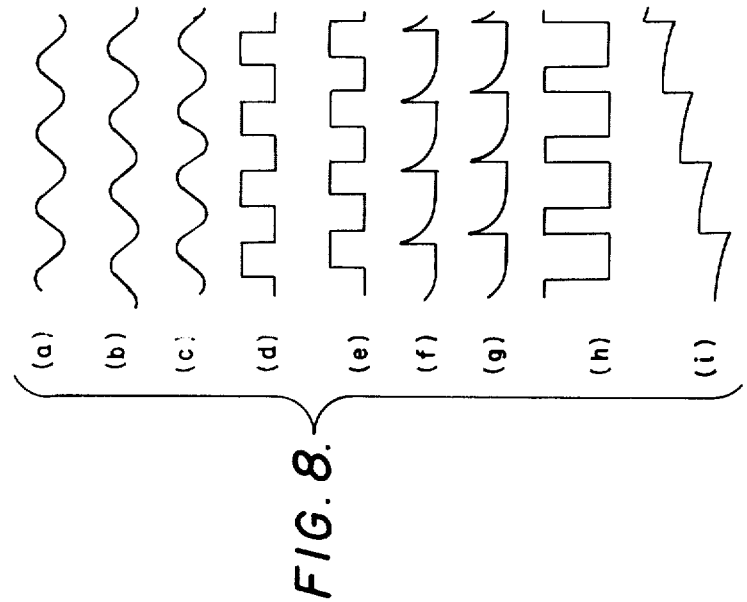
FIG. 8.
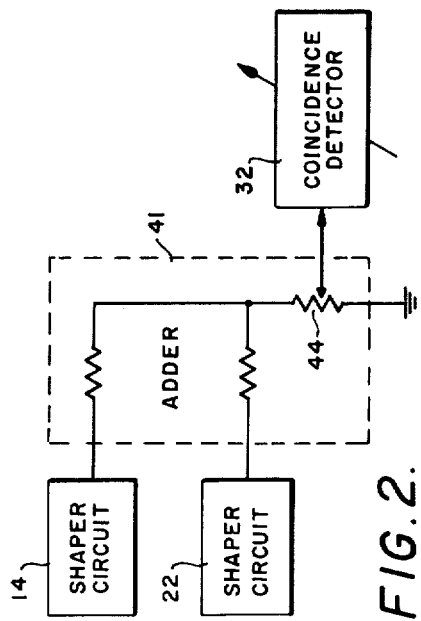
FIG. 7.
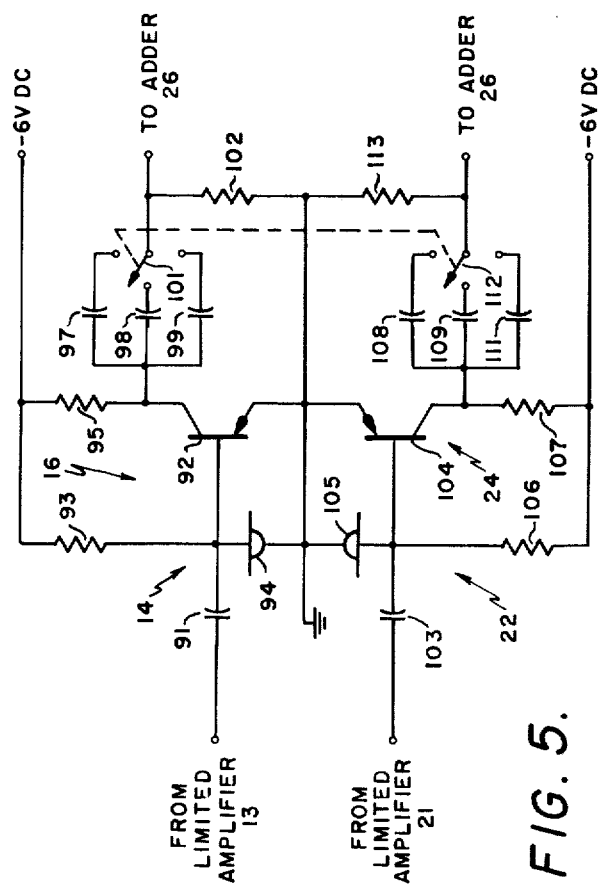
FIG. 5.
FIG. 2.
INVENTOR.
HENRY L. WARNER

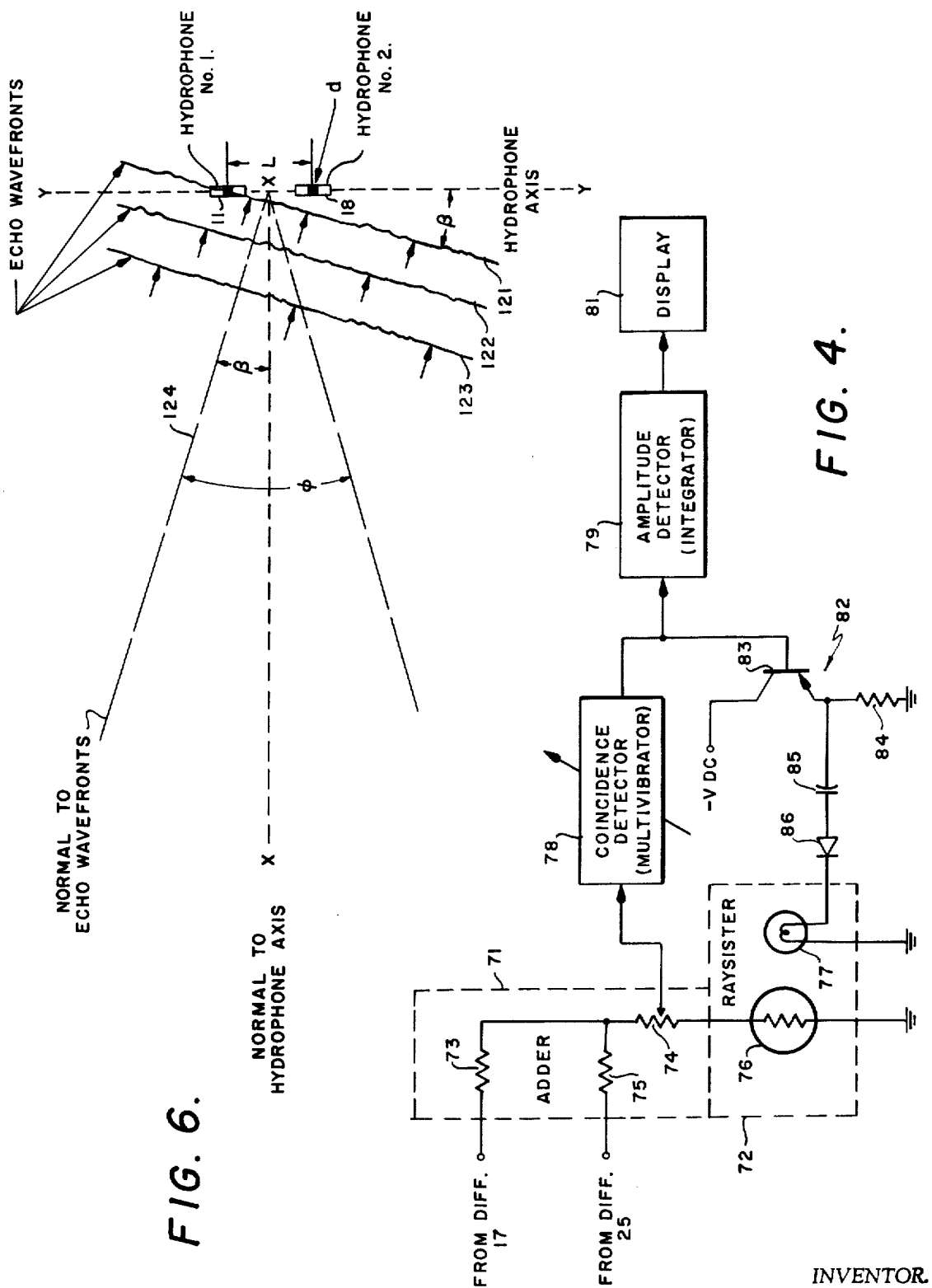

SONAR SYSTEM

The invention described herein may be manufactured and used by or for the Government of the United States of America for governmental purposes without the payment of any royalties thereon or therefor.

The present invention relates in general to sonar systems, and in particular is a method and means for controlling the observed beamwidth or an angular resolution of the echo received from a target by a phase comparison sonar receiver.

In the past, techniques for computing and determining the effective sonar receiving beamwidth at any given instant utilized the total width of the projector sensitive lobe, the width of the "distorter" pulse, and the wavelength of transmitted sonar signals. Hydrophone spacing was apparently not considered as being a factor which affected the coincidence zone width or the control thereof, and apparently no effort was made to adjust the width of the zone during the normal receiving operations.

The instant invention overcomes many of the disadvantages of the prior art sonar systems because it facilitates the acquisition, resolution, and identification of one or more targets submerged within an aqueous medium by appropriately varying the beamwidth with which they are "observed" during echo-search operations.

It is, therefore, an object of this invention to provide an improved sonar system.

Another object of this invention is to provide an improved method and means for locating and identifying submarine targets.

Still another object of this invention is to provide an improved phase comparison sonar system.

A further object of this invention is to provide an improved echo-search receiver system.

Another object of this invention is to provide an improved method and means for displaying two or more received target echo beamwidths, either individually or simultaneously.

A further object of this invention is to provide a phase comparison sonar system having receiver beamwidth varying capabilities.

A further object of this invention is to provide an improved phase comparison sonar system whose effective receiver beamwidth is not contingent upon any particular signal wavelength being transmitted.

Another object of this invention is to provide a sonar system having a receiver search beam that may be varied within predetermined limits as desired.

Still another object of this invention is to provide a method and means for improving the speed and accuracy of searching for and identifying an underwater target.

Still another object of this invention is to provide a high-definition phase comparison sonar that will simultaneously display both predetermined narrow and broad received beamwidths.

Another object of this invention is to provide a new and novel concept for adjusting the beamwidth of a received sonar signal by using the principle that observed beamwidth depends on hydrophone spacing and zero-crossing marker pulse width.

Another object of this invention is to provide a relatively simple, compact phase comparison sonar system that may be easily and economically manufactured, operated, and maintained.

Other objects and many of the attendant advantages will be readily appreciated as the subject invention becomes better understood by reference to the following detailed description when considered in conjunction with the accompanying drawing wherein;

FIG. 1 is a combination block and schematic diagram of an exemplary preferred embodiment of the subject invention;

FIG. 2 is a combination block and schematic diagram depicting an adder circuit that may be substituted for the adder circuit of FIG. 1;

FIG. 3 is a combination block and schematic diagram of a means that may be incorporated in the device of FIG. 1 for simultaneously displaying both broad and narrow angular beamwidths;

FIG. 4 illustrates a method and means for automatically controlling the beamwidth obtained by the subject invention, wherein a predetermined parameter of the received echo (such as an overall reverberation level represented by counts per unit time) is used as the controlling means;

FIG. 5 is a detailed schematic diagram of the shaper circuits of FIG. 1;

FIG. 6 is a quasi-pictorial representation of acoustical wavefronts approaching and timely contacting a pair of typically spaced hydrophones;

FIG. 7 is another quasi-pictorial view which illustrates a surface vessel incorporating and using the sonar system of this invention; and FIG. 8 is a graphical representation of ideal signal waveforms which may occur at various and sundry elements within the device of FIG. 1.

Referring now to FIG. 1, a preferred embodiment of this invention is shown as having a first hydrophone 11, the output of which is coupled through a preamplifier 12 and a limiter amplifier 13 to the input of a shaper circuit 14. In this particular instance, the aforesaid input to shaper circuit 14 is actually applied to a tunnel diode switch 15, and the output thereof is, in turn, coupled through an amplifier 16 to variable differentiator 17, with the output thereof constituting the output of said shaper circuit 14.

Another hydrophone 18, contiguously disposed with hydrophone 11, has its output coupled through a preamplifier 19 and a limiter amplifier 21 to the input of another shaper circuit 22. Like in the aforementioned shaper circuit 14, the actual input of shaper circuit 22 is applied to a tunnel diode switch 23, and the output of tunnel diode switch 23 is coupled through an amplifier 24 to a variable differentiator 25. The output of differentiator 25, of course, constitutes the output of the aforesaid shaper circuit 22.

Inasmuch as this particular preferred embodiment is a sonar system, the aforementioned hydrophones 11 and 18 are intended to be submerged within some predetermined aqueous medium such as for example, water, seawater, or the like, and, therefore, it should be understood that they should be conventionally adapted for such disposition.

The aforesaid shaper circuits 14 and 22 are substantially identical and will be discussed in detail subsequently in conjunction with FIG. 5.

As may readily be seen, for all practical purposes, those elements referrred to as hydrophone 11, preamplifier 12, limiter amplifier 13, and shaper circuit 14 actually constitute a first signal processing channel, while the aforementioned hydrophone 18, preamplifier 19, limiter amplifier 21, and shaper circuit 22, constitute a second processing channel. The outputs of said first and second channels are, thus, respectively obtained from the output of differentiator 17 of shaper circuit 14 and of differentiator 25 of shaper circuit 22.

Said first and second channel outputs are than coupled to an adder circuit 26 and, in this particular case, the output from differentiator 17 is coupled through a resistor 27 and a resistor 28 to a ground 29. The output a differentiator 25 is likewise coupled through a resistor 31 to the common junction of the aforesaid resistor 27 and 28.

Said common junction of resistors 27 and 28 actually constitute the output of adder 26 and is, therefore, connected to the input of a multivibrator type variable coincidence detector 32. The output of coincidence detector 32 is connected to the input of an integrator type amplitude detector 33, the output of which is coupled to an appropriate readout or display device 34. Of course, said display device may be any of many well known types which provides the readout of the information desired during any particular operational circumstances. For example, it may be a storage oscilloscope, a standard oscilloscope in combination with moving photosensitive material, a recorder, or the like. Obviously, the proper selection thereof would be well within the purview of one skilled in the art having the benefit of the teachings herewith presented.

In order for the sonar receiver of FIG. 1 to be operable, it should, of course, be understood that a sonar transmitter containing its own electroacoustical projector is part thereof and timely operated therewith; therefore, although as shown in FIG. 1 for the purpose of simplicity, the received beamwidths of signals referenced as $\phi_1$ and $\phi_2$ are the echoes of originally transmitted signals which have been reflected from one or more submarine targets within said seawater environment.

If so desired, adder circuit 26 may be so designed as to have the output thereof be of some predetermined and manually selectable voltage level before it is applied to coincidence detector 32. FIG. 2 includes an exemplary structural configuration of such an adder circuit, and is therein referenced as adder 41. The inputs to adder 41 are received from the outputs of shaper circuits 14 and 22, and are effectively interconnected and coupled through the resistance portion of a potentiometer 44 to said ground. In this particular case then, the output of adder 41 is taken from the slidable arm of potentiometer 44 and is applied to coincidence detector 32.

Another arrangement which may be used to simultaneously display the narrow beamwidth of $\phi_1$ and the broad beamwidth of $\phi_2$ is depicted in FIG. 3. In this particular situation, it is shown that the output from variable differentiators 17 and 25 are applied to an adder circuit 51. Adder 51 contains a resistor 52 connected in series with the resistance portion of a potentiometer 53, the latter of which has a terminal that is connected to ground. The respective common junctions of resistor 52 and potentiometer 53 and resistor 54 and potentiometer 55 are interconnected by an electrical conductor 56, thereby forming the structure which performs the adding or summing function across the resistances of both potentiometers 53 and 55. Of course, as may readily be seen, the outputs from differentiators 17 and 25 are respectively connected to the aforesaid resistors 52 and 54, and the outputs of adder circuit 51 are likewise respectively taken from the slider arms of potentiometers 53 and 55.

Again, in order to display a pair of beams having different angular beamwidths, a pair of processing channels are necessary for the production thereof. Hence, the output of adder 51 which is taken from the slider arm of potentiometer 53 is connected to an adjustable, broadbeam, multivibrator type coincidence detector 57, the output of which is coupled through an integrator type amplitude detector 58 before being applied to one of the inputs of display 59. The other output from adder circuit 51 which is taken from the slider arm of potentiometer 55 is applied in an adjustable, narrowbeam, multivibrator type coincidence detector 61, with the output thereof coupled through an integrator type amplitude detector 62 before being applied to another of the inputs of the aforesaid display 59.

Still another circuit arrangement which may be substituted for that portion of the circuit arrangement of FIG. 1 which is referenced as adder 26, coincidence detector 32, amplitude detector 33, and display 34, is illustrated in FIG. 4. In this particular circuit embodiment, the outputs from differentiators 17 and 25 are coupled to the inputs of adder circuit 71. As may readily be seen, adder circuit 71 is substantially identical to the aforementioned adder circuit 41 of FIG. 2, with the exception that a RAYSISTOR 72 is coupled between the resistance portion of the potentiometer thereof and ground. Hence it may be seen that the output from differentiator 17 is coupled through a resistor 73 to one terminal of the resistance portion of potentiometer 74. The other terminal of the resistance portion of potentiometer 24 is, in this particular embodiment, actually coupled through a condition responsive type resistor 76, whose resistance is varied in direct proportion to the light or other predetermined radiant energy impinging thereon at any given instant, to ground. In contiguous relationship with said variable resistor 76 is an electric lamp 77, the brightness of which is directly proportional to the current supplied thereto. Of course, as may readily be seen from FIG. 4 RAYSISTOR 72 consists of the disclosed arrangement of variable resistor 76 and lamp 77, with the light from the latter regulating the resistance of the former.

The output of adder circuit 71 is taken from the slider arm of potentiometer 74 and applied to a multivibrator type, adjustable coincidence detector 78, and the output thereof is coupled through an integrator type amplitude detector 79 before being supplied to a display means 81.

The output of coincidence detector 78 is also coupled through a negative feedback network 82 to the aforesaid lamp 77 for the purpose of automatically adjusting the current flow thereto, for reasons which will be given below in the discussion of the operation of this invention. In this particular embodiment, feedback network 82 contains a transistor 83 having an emitter, a collector, and a base, with the base thereof connected to the output of the aforementioned coincidence detector 78. The collector of transistor 83 is coupled to a predetermined negative DC voltage, and the emitter thereof is coupled through a resistor 84 to ground. Because the output of transistor 83 is taken from the emitter thereof, transistor 83, in fact, constitutes an emitter-follower, which acts as a circuit isolation device between coincidence detector 78 and the aforementioned RAYSISTOR 72. The output of transistor 83 is then coupled through a capacitor 85 and a series connected diode 86 before being applied to lamp 77 of RAYSISTOR 72.

Referring now to FIG. 5, there is shown a detailed circuit arrangement of the aforementioned shaper circuits 14 and 22. The input to shaper circuit 14, for example, is taken from limiter amplifier 13 and is coupled through a capacitor 91 to the base of a 2N710 transistor 92. The base of said transistor 92 is coupled through a resistor 93 to a negative 6 volt direct current voltage, and through a 1N2941 tunnel diode 94 to ground. The collector of transistor 92 is coupled through a resistor 95 to said negative 6 volt direct current voltage, and also to a bank of capacitors consisting of capacitors 97, 98, and 99. Capacitors 97, 98, and 99 are also connected to a trio of fixed contacts of a manual selector switch 101. The selector arm thereof constitutes the output which is connected to one of the inputs of adder 26 and is also coupled through a resistor 102 to said ground and the emitter of transistor 92, thereby completing the aforementioned variable differentiator circuit 17.

As may readily be seen in this particular circuit diagram, tunnel diode 94 is the actual operator of the aforementioned tunnel diode switch 15, transistor 92 is included in the aforementioned amplifier 16, and the capacitor bank, selector switch 101 and resistor 102, when acting in concert comprise the aforementioned variable differentiator 17.

Shaper circuit 22 is substantially identical to the foregoing shaper circuit 14; therefore, comparable elements thereof respectively have substantially identical values, in order to make both of said shaper circuits function alike.

In detail now, shaper circuit 22 is shown as having its input applied from limiter amplifier 21, with said input being coupled through a coupling capacitor 103 to the base of a 2N710 transistor amplifier 104. Likewise, coupled to the base of transistor 104 is a 1N2941 tunnel diode 105 which, in turn, is also coupled to ground. Both the base and collector of transistor 107 are respectively coupled through a pair of resistors 106 and 107 to a negative 6 volt direct current voltage, and the emitter thereof is directly connected to ground. The output from transistor amplifier 104 is taken from the collector thereof and applied to a bank of capacitors consisting of 108, 109, and 111, which, in turn, are coupled to the stationary contacts of a selector switch 112. The slide arm of switch 112 is coupled through a resistor 113 to ground. Of course, as may readily be seen, the aforesaid bank of capacitors, selector switch 112, and resistor 113 combine to form the aforementioned variable differentiator 25. Also, as may readily be seen, the outputs of the aforementioned shaper circuit 14, as well as the presently discussed shaper circuit 22, are taken from the slide arms of switches 101, and 112, respectively, and are applied to the inputs of adder circuit 26.

In the preferred embodiment of the shaper circuits shown in FIG. 5, the slide arms of selector switches 101 and 112 are depicted as being ganged together so that identical individual capacitors from the aforementioned capacitor banks will be operable in differentiators 17 and 25 at any given instant. However, it would appear to be noteworthy that should operational circumstances warrant, said selector switches 101 and 112 need not be ganged together for reasons which will be presented subsequently in the discussion of the operation of the devices shown in FIG. 5.

Referring now to FIG. 6, there is shown a theoretical, idealized, quasi-pictorial view of what occurs as wavefronts of acoustical energy approach and contact a pair of adjacently spaced hydrophones. Assuming for the sake of simplicity that the hydrophones of FIG. 6 are those hydrophones 11 and 18 previously illustrated in FIG. 1, it should be noted that their respective theoretical centers are spaced some distance L apart, and also that the centers thereof coincide with an imaginary hydrophone axis Y—Y. Another imaginary axis X—X is pictorially shown as being normal to the aforesaid axis Y—Y and intersects therewith at a predetermined point which is located at the center of the distance between said hydrophones 11 and 18.

In this particular instance, three representative echo wavefronts 121, 122, and 123 are shown as moving toward hydrophones 11 and 18, with wavefront 121 thereof actually coming into contact with hydrophone 11. Because said wavefronts are not, in this particular case, approaching hydrophones 11 and 18 along a path parallel to normal axis X—X, wavefront 121 has a distance d to go before impinging upon hydrophone 18. Accordingly, then, an angle $\beta$ exists at this particular time between wavefront 121 and axis Y—Y. For reasons well defined by the laws of geometry, an axis 124 which is normal to each of the aforesaid wavefronts likewise forms the angle $\beta$ therebetween and the aforesaid axis X—X. If the aforementioned electronics are adjusted to accept as coincident, wavefronts arriving at an angle $\beta$ to normal X—X, then since the earliest arrival may be in either channel; i.e., $\beta$ can be on either side of normal X—X, the total coincidence zone is then $2\beta$, or $\phi$. Angle $\phi$, in this particular case, may become angles $\phi_1$, $\phi_2$, etc., illustrated in FIG. 1, or any other angle within the design limits of this invention that may be acquired as a result of appropriately adjusting the aforementioned differentiators 17 and 25.

FIG. 7 is a quasi-pictorial view of a ship 131, in which typically a sonar system of the type herewith described may be incorporated for the purpose of hunting and identifying submarine objects. In this particular figure, ship 131 contains the subject sonar system referenced as 132 which conventionally contains a transmitter 133 and the receiver portion thereof 134. Transmitter 133 has a conventional electroacoustical energy projector 135 which broadcasts acoustical energy 136 throughout a predetermined portion of seawater 137 or the like, in order to search for such targets as mine 138, which is lying on or perhaps partially submerged in seafloor 139. The echo 144 reflected from such submarine targets or seafloor or both is, in turn, received by the aforementioned hydrophones 11 and 18 connected to the subject invention. It should be understood, of course, that any particular predetermined targets or plurality thereof, may be searched for by this invention; hence, although only mine 138 is illustrated in FIG. 7, such items as submarine boats, icebergs, sea floor characteristics, and perhaps even sea animals and human beings, are susceptible to being located and identified because the resolution thereof may be more conveniently effected by the variable search beamwidth displays available as a result of this invention.

Briefly, the theory of operation of the subject invention will now be discussed.

Generally speaking, with respect to high-definition phase comparison sonars, the coincidence zone or effective beamwidth determines the degree of angular resolution that can be obtained. However, by proper construction of such sonars in accordance with the teachings herein presented, it has been found that the angular beamwidth that is received and observed by the subject sonar receiver may be varied as desired (or, if preferred, a predetermined optimum fixed angular beamwidth may be effected) merely by appropriately spacing the receiver hydrophones and properly selecting and adjusting the width of the marker pulses. The latter are generated in the receiver at the time the acoustic wavefront causes the hydrophone output signal to be negative-going and at approximately the zero-crossing voltage level. When the phase relationships of the marker pulses initiated by each hydrophone are determined, as is conventional in phase-comparison sonar systems, target direction information is obtained. But, if in addition to the determination of said phase relationships, the aforesaid marker pulses are further processed to generate constant amplitude signals having substantially square waveforms with the positive width thereof proportional to the degree of coincidence existing between said marker pulses, the observed beamwidth is, likewise, proportional thereto. Of course, it may then readily be seen that, if the width or period of the aforesaid marker pulses is intentionally varied manually, the amount of effective coincidence therebetween is also varied, and, hence, the angular beamwidth is varied, too; thus, practically any desired angular beamwidth may be obtained.

To give an indication of the particular beamwidth being observed at any given time, it merely becomes necessary to measure and display, in informative terms, the aforesaid degree of coincidence of the marker pulses.

In some phase comparison sonar applications, it is necessary to display bottom reverberations from within the coincidence zone in order to effectively display "shadows" — "shadows" herein being defined as the lack of reverberation which occurs behind a target as a result of its having some height above the sea bottom, as compared to those reverberations which are reflected from the line of sight portion of the sea floor adjacent to and surrounding the target and from the target itself. This shadowing, of course, helps to determine the shape of a target and thereby aids in the identification thereof.

Furthermore, in areas of low acoustic back-scattering, it becomes desirable to increase the beamwidth of the sonar echo signal, in order to effectively increase the quantity thereof, so as to obtain enough reverberations to effectively display said target shadows, and thereby increase the probabilities of correct target identification.

Adjustment of the echo beamwidth by the human operator helps determine whether echoes are due to the existance of a group of small targets, or due to the reflection of highlights from a large target, since a group of small targets would have little or no shadow on a broad beam display, in contrast to a large target. The simultaneous display of both narrow and broad beams would also effect substantially the same results.

Considering now the operation of the subject invention specifically, it may be seen that the preferred embodiment of FIG. 1 receives the reflected echo signals from one or more targets. These signals were, of course, originally transmitted by a typical sonar transmitter and electroacoustical transducer substantially in the manner shown in the quasi-pictorial view of FIG. 7. For example, an acoustical signal having a waveform similar to that shown in FIG. 8(a) is originally broadcast throughout a predetermined volume of seawater in order to search for one or more submarine targets. In the illustration of FIG. 7, the target happens to be a semi-buried mine. However, as previously mentioned it should be understood that any suitable predetermined target may be searched for by this invention and, furthermore, in order to facilitate such search, the subject sonar system may be incorporated in any suitable carrier vehicle such as, for example, a submarine boat, an aircraft, or other appropriate surface vessels, as well as a ship.

In this particular case, two exemplary beamwidths, respectively, referenced as $\phi_1$ and $\phi_2$, are disclosed as being received by contiguously disposed hydrophones 11 and 18. Each of said beamwidths, of course, is receiving its portion of acoustical echo signals from a target, and they are essentially of the type shown in an idealized form in FIG. 8(b) and (c). Inspection of FIG. 8(a), (b), and (c), will disclose that each of the waveforms thereof are similar but have different phase relationships. The exemplary phase relationship of FIG. 8(b) with respect to FIG. 8(a) results from the time interval required for the echo-search signal to travel to and from any particular target. The phase relationship of FIG. 8(b) and 8(c) are depicted as being different, in order to indicate that the echo wavefront is received at one hydrophone before it is received at the other. A cursory inspection of FIG. 6 at this time will show that such a phase relationship will exist whenever the echo wavefronts approach adjacently spaced hydrophones from any direction other than that which is normal to the Y—Y axis passing through the centers thereof.

As the acoustical signals timely arrive at hydrophones 11 and 18, they are converted into proportional electrical signals which are then amplified to a more useful level by preamplifiers 12 and 19, respectively. Since in phase comparison sonars it is the phase relationship of the signals in the two (or more) receivers that is measured to yield bearing information, it is desirable that the processed signals be made independent of any amplitude variations that may exist in the received echo signals. Further, the greater the signal is enlarged or amplified, the more precisely the instant can be determined in which the signal acquires some preselected voltage level. Accordingly, limiter amplifiers 13 and 21 receive the amplitude signals from preamplifiers 12 and 19 respectively, and by amplifying and limiting them, they remove spurious amplitude variations, if any, while preserving the phase information. Accordingly, the outputs from limiter amplifiers 13 and 21 will be substantially similar to those idealized waveforms respectively depicted in FIG. 8(d) and FIG. 8(e). As may readily be seen from said waveforms, all amplitude variations have been removed therefrom, but a relative phase relationship still exists therebetween.

The phases of the outputs from limiter amplifiers 13 and 21 are then compared in this invention in a unique manner which provides an exceedingly accurate phase measurement therebetween. Some of this processing occurs in shaper circuits 14 and 22 depicted in block form in FIG. 1 and in schematic detail in FIG. 5. Considering again the device of FIG. 1, the aforementioned phases are compared in shaper circuits 14 and 22 by comparing the times of their negative-going zero-crossings. Whenever conjugate zero-crossings occur within a time interval determined by predetermined design circuit parameters, an output signal is produced. As a result of the rapid triggering of tunnel diode switches 15 and 23 at a potential that is very near zero, a very fast rise-time pulse is produced. After being amplified, respectively, by amplifiers 16 and 24, these fast rise-time pulses are then differentiated by differentiators 17 and 25 to form marker pulses of the type exemplarily shown in FIG. 8(f) and FIG. 8(g). Although the waveforms of FIG. 8(f) and FIG. 8(g) are idealized, an inspection thereof will not only disclose that their leading edges occur at the time of the negative-going zero-crossings of FIG. 8(d) and (e), they will show that the widths thereof are directly proportional to the slope of the decaying following edge, which, in turn, is determined by the manual adjustment of variable differentiators 17 and 25. It may also be seen, then, that the amount of coincidence of the marker pulses of FIG. 8(f) and FIG. 8(g) may be practically obtained by a simple addition thereof. Accordingly they are applied to the input of adder circuit 26, which produces an output signal equal to the sum thereof.

This sum signal is then further processed by a conventional coincidence detector which converts the coincident time of the signals of FIG. 8(f) and FIG. 8(g) into a substantially square wave signal having positive width portions which are proportional thereto. Although many well known coincidence detectors are eminently suitable for performing this function, a representative, Schmitt trigger type that may be used for this purpose may be found at page 199 of G. E. Transistor Manual, 7th Edition. The output of coincidence detector 32 is similar to the waveform of FIG. 8(h) and is then applied to an integrator type amplitude detector 33 which produces a voltage level, such as is shown in FIG. 8(i), that may be applied to a suitable readout or display means. This integrated voltage is proportional to the number of coincidence marker pulses occurring within the time constant of the integrator.

By changing the width of the marker pulses (that is, the width of the positive pulses of the waveforms of FIG. 8(f) and FIG. 8(g), a different angle $\phi$ or beamwidth may be obtained. This may be seen by considering that a wavefront which does not arrive simultaneously at the two hydrophones will give a coincidence output signal indication if the zero-crossing marker pulse generated in the first arrival channel endures until a marker pulse is generated in the second channel. If the hypothetical illustration of FIG. 6 is considered, it may be seen, that for this condition to exist, distance $d$ must not be greater than the distance which sound can travel at a velocity $c$ in time $t_m$, with $t_m$ also being equal to the width of the positive marker pulses. Letting $\beta$ be the angle between the hydrophones and echo wavefronts, and L be the distance between hydrophone centers, and c equal the speed of sound in water; then, $$\sin \beta = \frac{d}{L}$$

but,  $d = c\, t_m$ so,  $\beta = \dfrac{\arcsin c\, t_m}{L}$

Since the echo wavefront can arrive first at either hydrophone, the coincidence zone angle is equal to 2B and is symmetrical about the perpendicular bisector of L. Therefore, $$\sin \phi = \sin 2\beta = \frac{2\, c\, t_m \cos \beta}{L}$$

For small values of $\beta$, $\cos \beta \simeq 1$, then, $$\sin \phi = \frac{2\, c\, t_m}{L}$$

$$\phi = \arcsin \frac{2\, c\, t_m}{L}$$

This mathematically proves that the coincidence zone or effective beamwidth of the receiver depends only on the width $t_m$ of the zero-crossing marker pulse and the effective spacing L of the hydrophones. For a given beamwidth, the hydrophone spacing L may be fixed during hydrophone construction, and the marker pulse width, $t_m$, may be selected during the design of the tunnel diode switch and differentiator circuits. If the RC time constants of the differentiators are made adjustable, the beamwidth of the sonar receiver can be changed during normal operations.

In practice, the hydrophone spacing, L, cannot be increased indefinitely to obtain narrower beams, since ambiguities occur, when the spacing thereof becomes greater than the length of the projector. Thus, the very narrow beams needed to obtain high definition sonar performance will generally be obtained by using extremely narrow marker pulse widths. The, the coincidence detector being essentially a voltage level detector whose firing level may be changed, may be adjusted so that the peak value of both marker pulses must coincide in order to trigger it, and, in such case, a very narrow beamwidth is effected. This, of course, changes the effective width of the marker pulses. Thus, it may be seen that control of both the differentiator and the coincidence detector provides considerable latitude in the selection and refinement of the beamwidth to be used during any particular operational circumstances.

FIG. 2 is included in the disclosure merely to show that another adder circuit, the output level of which is adjustable, may be substituted for adder 26 in the device of FIG. 1. As may readily be seen, both adders 26 and 41 operate in a substantially comparable manner with the exception that the latter provides another adjustment feature for the purpose of controlling the sensitivity or firing voltage level of the subsequent signal processing coincidence detector element.

The device of FIG. 3 operates essentially in the same manner as the device of FIG. 1. However, adder circuit 51 thereof is so constructed as to enable signal processing to occur in both a broad beamwidth channel and a narrow beamwidth channel, either individually or simultaneously as desired. Again, as in adder 41 of FIG. 2, the firing voltage levels may be changed by adjustment of potentiometers 53 and 55. Consequently, when properly set, respective coincidence detectors 57 and 61 are triggered at different levels and, thus, effectively become broad and narrow beam detectors. Ordinarily, in order to provide an intelligible display of said broad and narrow beamwidths to a human operator, they are both displayed on the same readout means such as is represented by display 59.

The modification of the subject invention shown in FIG. 4 (which, of course, may be incorporated in the device of FIG. 1) includes a RAYSISTOR which effectively changes the resistance between the adding junction of adder 71 and ground. This allows some parameter of the received echo to be sampled and used to automatically vary the beamwidth, so that it will be optimized in cases where circumstances would otherwise include said parameter as something adverse to normal operation. This conveniently effected by sampling the output signal from coincidence detector 78 and passing it through a circuit isolation emitter-follower amplifier, a capacitor, and a diode, before applying it to the filament of a lamp, the brightness of which is varied in direct proportion to the feedback current supplied thereto. This brightness is then, in turn, used to vary the resitance of a photosensitive variable resistor which, as may readily be seen, effectively varies the potential of the input signal to coincidence detector 78.

As previously mentioned, shaper circuits 14 and 22 are both shown in detail schematically in FIG. 5. Because both shaper circuits operate essentially in an identical manner, only the operation of shaper circuit 14 will be discussed at this time.

As may be seen, the input to said shaper circuit is derived from limiter amplifier 13, the output of which looks substantially like the waveform depicted in FIG. 8(d). In this particular instance, the actuator point or operator portion of the waveform of FIG. 8 (d) is intended to proximate the zero-crossing of the negative-going portion of the signal; however, since an actual zero-crossing operator ostensively is not as yet within the state-of-the-art with respect to tunnel diodes, an exceedingly close approximation thereof (such as, for example, −15 millivolts) will be used in this case, and it will herein be defined as a zero-crossing voltage, because for all practical purposes that is what it is. Accordingly, if the negative-going portion of the waveform of FIG. 8(d) is applied to the input of tunnel switch 18, the tunnel diode rapidly changes from a nonconductive state to a conductive state at approximately the aforesaid zero-crossing. Hence, in this particular instance, the voltage applied to the base of transistor 92 effectively becomes zero-voltage, which, in turn, rapidly changes its state from a non-conductive to a conductive state. When this change of state occurs, the emitter of transistor 92 very rapidly changes in potential from approximately −6 volts to approximately ground potential, and therey applies a rapid 6 volt rise to the selected one of the capacitors of differentiator 17.

Because the degree of coincidence between the outputs of differentiators 17 and 25 is a critical factor in determining the beamwidth of the received echo signal, the very rapid rise-time which is effected by the use of tunnel diodes is an exceedingly important factor in producing the improved phase distinguishing characteristics obtained from the shaper circuits shown in FIG. 5. As is conventional in differentiators, the slope of the following edge of the output signals therefrom is contingent upon the proper selection of the particular capacitor-resistor arrangement (that is, the particular R C time constant) incorporated therein. In the case of differentiator 17, it is contingent upon selecting one of capacitors 97 through 99 and properly combining it with resistor 102 by means of manual selector switch 101.

The output signals from shaper circuits 14 and 22 will be substantially identical in waveform, but slightly shifted in phase an amount which is directly proportional to the time the echo signal is received by hydrophones 11 and 18. Accordingly, this phase difference may be conventionally used to provide directional information; that is, information concerning the direction to the reflecting target at any particular instant. But when these two output signals are further processed to measure how long a period of time their positive pulse portions are in coincidence, there is additionally provided an indication of the beamwidth of the received echo signal, and this, of course, may be displayed to an advantage.

Both the structure and individual operation of each of the components respectively depicted in each of the aforementioned figures are well known conventional, per se. Therefore, it should be understood that it is their unique interconnection and interaction which produces the subject invention disclosed herein and its new and useful results.

Obviously other modifications and embodiments of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. Means for varying the beamwidth of a phase-comparison sonar receiver comprising in combination,
    a pair hydrophones, each of which is faced along a predetermined axis, and each of which is spatially disposed a predetermined distance from the other,
    variable means connected to the outputs of said hydrophones for selectively and respectively generating a pair of rapid-rise marker pulses whenever the negative-going zero-crossing portion of an acoustical wavefront impacts thereon,
    means connected to said marker pulse generating means for adding predetermined amplitudes of the pair of marker pulses generated thereby and for producing an electrical voltage proportional thereto, and
    means effectively connected to said adding means for reading out the electrical voltage therefrom in terms of both broad and narrow sonar receiver beamwidths.

2. The device of claim 1 wherein said means effectively connected to said adding means for reading out the electrical voltage therefrom in terms of both broad and narrow sonar receiver beamwidths comprises,
    a broadbeam coincidence detector coupled to one of the outputs of said adder circuit,
    a first amplitude detector connected to the output of said broadbeam coincidence detector,
    a narrow beam coincidence detector connected to the other output of said adder circuit,
    a second amplitude detector coupled to the output of said narrow beam coincidence detector, and
    a display means connected to the outputs of said first and second amplitude detectors.

3. Means for varying the beamwidth of a phase-comparison sonar receiver comprising in combination,
    a pair of hydrophones, each of which is faced along a predetermined axis, and each of which is spatially disposed a predetermined distance from the other,

13 variable means connected to the outputs of said hydrophones for selectively and respectfully generating a pair of rapid-rise marker pulses whenever the negative-going zero-crossing portion of an acoustical wavefront impacts theron, means connected to said marker pulse generating means for adding predetermined amplitudes of the pair of marker pulses generated thereby and for producing an electrical voltage proportional thereto, means coupled to the output of said adding means for producing a positive rectangular pulse whenever said electrical voltage exceeds a predetermined level and with the width thereof proportional to the time period said electrical voltage exceeds said predetermined level, means connected to the output of said positive rectangular pulse producing means for integrating the positive rectangular pulses produced thereby, and readout means connected to the output of said integrating means.

4. Means for controlling the receiver beamwidth of a phase comparison sonar system comprising in combination, a first hydrophone, a first limiter amplifier effectively coupled to the output of said first hydrophone, a first tunnel diode switch connected to the output of said first limiter amplifier, a first differentiator effectively connected to the output of said first tunnel diode switch, a second hydrophone contiguously disposed a predetermined distance from and in line with said first hydrophone, a second limiter amplifier effectively coupled to the output of said first hydrophone, a second tunnel diode switch connected to the output of said second limiter amplifier, a second differentiator effectively connected to the output of said second tunnel diode switch, an adder circuit connected to the ouputs of said first and second differentiators, and means connected to the output of said adder circuit for contiguously displaying the sum of the aforesaid differentiator outputs.

5. The device of claim 4 wherein said adder circuit comprises, a first inner resistor, a ground, another resistor connected between said first input resistor and said ground, a second input resistor connected to the junction of the aforesaid first input resistor and said another resistor, and an output terminal connected to said junction.

6. The device of claim 4 wherein said adder circuit comprises, a first input resistor, a second input resistor, a ground, a potentiometer having a resistance portion and a slider arm with the resistance portion thereof connected between said ground and an interconnection of the aforesaid first and second input resistance, with the aforesaid slider arm adapted for supplying the output therefrom.

14

7. A sonar receiver system comprising in combination, a pair of electroacoustical transducers each of which is faced along a predetermined axis, and each of which is spatially disposed a predetermined distance from the other, means effectively connected to the outputs of said transducers for limiting the amplitudes of the respective electrical signals emanating therefrom, means connected to the outputs of said limiting means for generating a pair of rapid-rise marker pulses whenever the negative-going portions of the respective electrical signals emanating therefrom cross substantially a zero datum potential, means coupled to the aforesaid marker pulse generating means for producing another electrical signal proportional to the amount of coincidence occurring between the marker pulses of said pairs of marker pulses, and means connected to the output of said another electrical signal producing means for reading out and displaying the proportional electrical signal therefrom in terms of the target echo beamwidth received by the aforesaid sonar receiver system at any given instant.

8. The device of claim 7 wherein said means connected to the outputs of said limiting means for generating a pair of rapid-rise marker pulses whenever the negative-going portions of the respective electrical signals emanating therefrom cross substantially a zero datum potential comprises, a first tunnel diode switch responsive to one of said electrical signals, a second tunnel diode switch responsive to the other of said electrical signals, a first transistor amplifier coupled to said first tunnel diode switch for being triggered thereby, a second transistor amplifier coupled to said second tunnel diode switch for being triggered thereby, a first differentiator connected to the output of said first transistor amplifier, and a second differentiator connected to the output of said second transistor amplifier.

9. Means for controlling the receiver beamwidth of a phase comparison sonar systems comprising in combination, a first hydrophone, a first limiter amplifier effectively coupled to the output of said first hydrophone, a first tunnel diode switch connected to the output of said first limiter amplifier, a first differentiator effectively connected to the output of said first tunnel diode switch, a second hydrophone contiguously disposed a predetermined distance from and in line with said first hydrophone, a second limiter amplifier effectively coupled to the output of said first hydrophone, a second tunnel diode switch connected to the output of said second limiter amplifier.

a second differentiator effectively connected to the output of said second tunnel diode switch, an adder circuit connected to the outputs of said first and second differentiators, a coincidence detector coupled to the output of said adder circuit, an amplitude detector coupled to the output of said coincidence detector, and a readout means connected to the output of the aforesaid amplitude detector.

10. A controllable beamwidth phase comparison sonar system comprising in combination,
a first hydrophone,
means connected to the output of said first hydrophone for producing a first marker pulse at substantially the time a negative-going zero-crossing acoustical signal makes contact therewith,
a second hydrophone,
means connected to the output of said second hydrophone for producing a second a second marker pulse at substantially the time the aforesaid negative-going zero-crossing acoustical signal makes contact therewith,
means connected to the outputs of said first and second marker pulse producing means for producing a square-wave electrical signal having positive portions proportional to the periods of coincidence of the aforesaid first and second marker pulses therefrom,
means coupled to the output of said electrical signal producing means for producing a voltage representing the integration of the positive portions of said square-wave electrical signal, and
means connected to the output of said integrating means for displaying said voltage in terms of sonar receiver beam-width.

11. The device of claim 10 wherein said means connected to the output of said first and second hydrophones for producing a marker pulse at substantially the time a negative-going zero-crossing acoustical signal makes contact with each thereof comprises,
a tunnel diode switch,
an amplifier coupled to the output of said tunnel diode switch, and
a variable differentiator connected to the output of said amplifier.

12. The device of claim 10 wherein said means connected to the outputs of said first and second marker pulse producing means for producing a squarewave electrical signal having positive portions proportional to the periods of coincidence of the aforesaid first and second marker pulses is a multivibrator.

13. Means for controlling the receiver beamwidth of a phase comparison sonar system comprising in combination,
a first hydrophone,
a first limiter amplifier effectively coupled to the output of said first hydrophone,
a first tunnel diode switch connected to the output of said first limiter amplifier,
a first differentiator effectively connected to the output of said first tunnel diode switch,
a second hydrophone contiguously disposed a predetermined distance from and in line with said first hydrophone,
a second limiter amplifier effectively coupled to the output of said first hydrophone,
a second tunnel diode switch connected to the output of said second limiter amplifier,
a second differentiator effectively connected to the output of said second tunnel diode switch,
an adder circuit connected to the outputs of said first and second differentiators,
a broadbeam coincidence detector coupled to the output of said adder circuit,
a first amplitude detector coupled to the output of said broadbeam coincidence detector,
a narrow beam coincidence detector coupled to the output of said adder circuit,
a second amplitude detector coupled to the output of said narrow beam coincidence detector, and
a display connected to the outputs of the aforesaid first and second amplitude detectors.

14. Means for controlling the receiver beamwidth of a phase comparison sonar system comprising in combination,
a first hydrophone,
a first limiter amplifier effectively coupled to the output of said first hydrophone,
a first tunnel diode switch connected to the output of said first limiter amplifier,
a first differentiator effectively connected to the output of said first tunnel diode switch,
a second hydrophone contiguously disposed a predetermined distance from and in line with said first hydrophone,
a second limiter amplifier effectively coupled to the output of said first hydrophone,
a second tunnel diode switch connected to the output of said second limiter amplifier,
a second differentiator effectively connected to the output of said second tunnel diode switch,
an adder circuit connected to the outputs of said first and second differentiators,
a coincidence detector coupled to the output of said adder circuit,
an amplitude detector coupled to the output of said coincidence detector,
a readout means connected to the output of the aforesaid amplitude detector,
a Raysistor coupled to said adder circuit for effectively varying the output signal level therefrom; and
means connected between the output of said coincidence detector and said Raysistor for feeding back a signal representing a predetermined characteristic thereof to said Raysistor for effectively compensating the output signal level of the aforesaid adder circuit by an amount proportional to the amount of said characteristic.

15. The device of claim 14 wherein said RAYSISTOR coupled to said adder circuit for effectively varying the output signal level therefrom comprises,
a photosensitive resistor the resistance of which is directly proportional to the amount of radiant energy impinging thereon, and
a lamp contiguously disposed with said photosensitive resistor the brightness of which is directly proportional to the amount of current supplied thereto.

16. The device of claim 14 wherein said means connected between the output of said coincidence detector and said RAYSISTOR for feeding back a predetermined parameter thereof to said RAYSISTOR for effectively compensating the output signal level of the aforesaid adder circuit by an amount proportional to the amount of said parameter comprises,
a negative direct current voltage,
a ground,
a transister having a base, an emitter, and a collector, with the base thereof connected to the output of said coincidence detector and with the collector thereof coupled to the aforesaid negative direct current voltage,
a resistor coupled between the emitter of said transistor and said ground,
a capacitor connected to the emitter of said transistor, and
a diode connected between said capacitor and the input of said RAYSISTOR.

* * * * *